Figure 1:
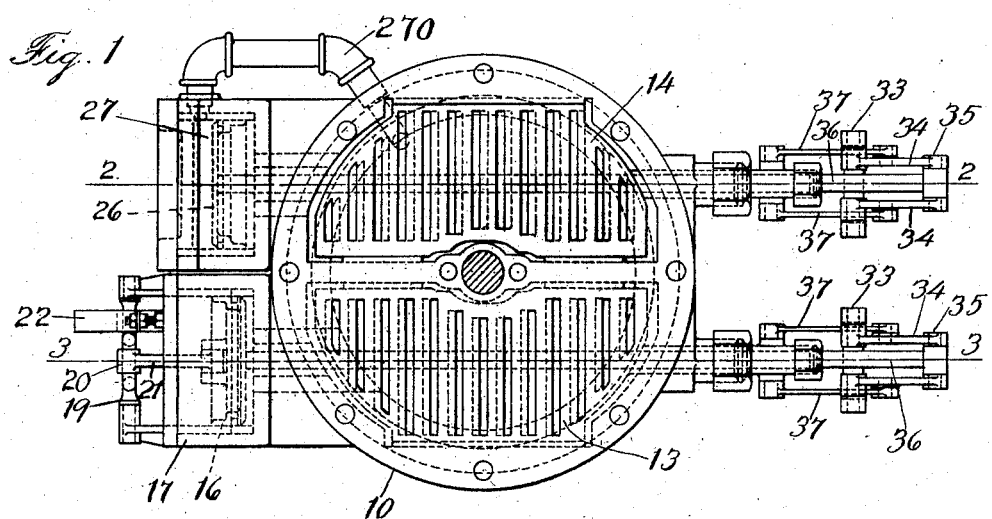

No. 878,562. PATENTED FEB. 11, 1908.
S. A. REEVE.
VALVE MECHANISM FOR COMPRESSORS.
APPLICATION FILED AUG. 10, 1906.

2 SHEETS—SHEET 1.

Witnesses:
G. Blyke
E. Shafer

Inventor:
S. A. Reeve
by Robert N. Pierson
atty.

No. 878,562. PATENTED FEB. 11, 1908.
S. A. REEVE.
VALVE MECHANISM FOR COMPRESSORS.
APPLICATION FILED AUG. 10, 1906.
2 SHEETS—SHEET 2.
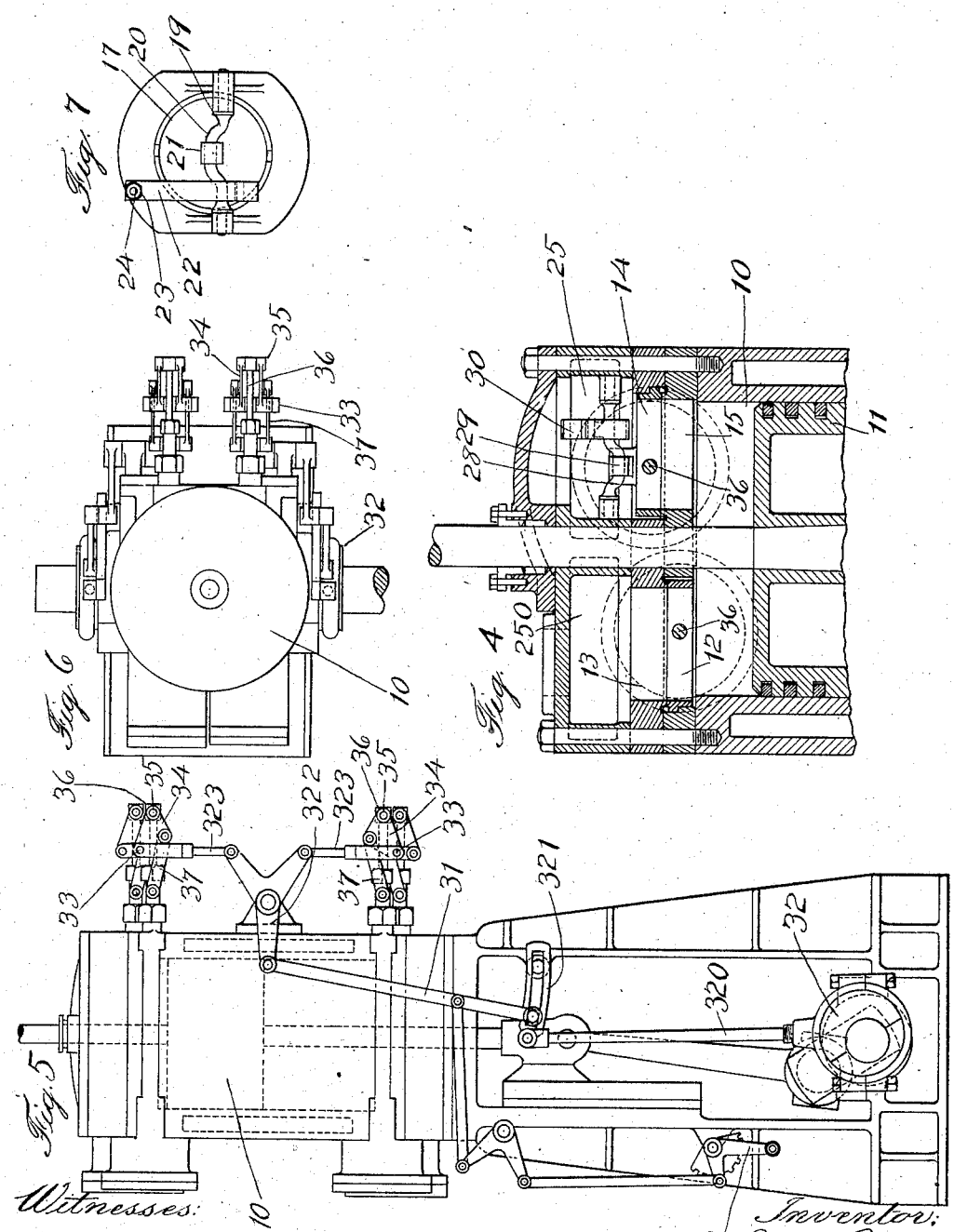

UNITED STATES PATENT OFFICE.

SIDNEY A. REEVE, OF WORCESTER, MASSACHUSETTS, ASSIGNOR TO CHARLES F. BROWN, TRUSTEE, OF READING, MASSACHUSETTS.

VALVE MECHANISM FOR COMPRESSORS.

No. 878,562.          Specification of Letters Patent.          Patented Feb. 11, 1908.

Application filed August 10, 1906. Serial No. 329,989.

*To all whom it may concern:*

Be it known that I, SIDNEY A. REEVE, a citizen of the United States, residing at Worcester in the county of Worcester and State of Massachusetts, have invented certain new and useful Improvements in Valve Mechanisms for Compressors, of which the following is a specification.

This invention relates to the compressors and other pumps, motors, fluid conduits, etc., and it has for its object to provide a valve-mechanism which will operate properly under higher speeds than are now attainable and which shall also be capable of correct operation under wide variations in speed.

The invention is especially applicable to compressors, though not wholly limited thereto.

It is a well-known difficulty in compressor work to obtain a wide port opening with a quick and sharp opening and closing movement of the valves and their operation without shock at various speeds. It is generally recognized that the grid form of valve gives the most advantageous port-opening with the shortest travel of the valve, but it has usually been considered necessary to operate grid valves with a positive valve-gear driven from the compressor shaft or similar moving part. Positive invariable timing, however, does not correspond to the theoretical requirements for valve-opening and closing under varying conditions. Devices constituting a compromise between variably-timed and positively-operated grid valves whereby the valves, although deriving motive power from the crank-shaft, are timed somewhat according to the pressure requirements, have heretofore been complicated and not wholly successful. Inertia enters in to a great extent, in the grid form of valve, as a disturbing factor which limits this style to a narrow range of speed, and to some degree it is a troublesome factor in all reciprocating valves.

The opposite expedient for obtaining a wide port opening, with opening and closing movements timed according to pressure conditions, is to use a large number of automatic, independent, puppet valves, but puppet valves have serious and well-known disadvantages which multiply in the ratio of their increase in number.

In the present invention I adopt the grid valve or any valve having its general characteristics, such as substantial absence of fluid motive pressure upon the valve proper, and as a propelling means I utilize in a novel manner the pressures within and without the compressor cylinder or other fluid-pressure chamber, acting upon a piston or equivalent motor member, in order that the valve may be opened and closed in accordance with the pressure conditions existing at any moment. With these devices I also combine a certain coöperating means for taking care of the varying inertia forces.

The result is an automatic pressure-operated valve of wide port opening, which operates smoothly and without shock and yet with a sharp opening and closing movement throughout a wide range of compressor speed, and up to a high limit of speed.

In connection with the foregoing I have shown, and for certain services may employ, a positive mechanical gear which combines in a novel and useful manner with the automatic gear.

Figure 2:
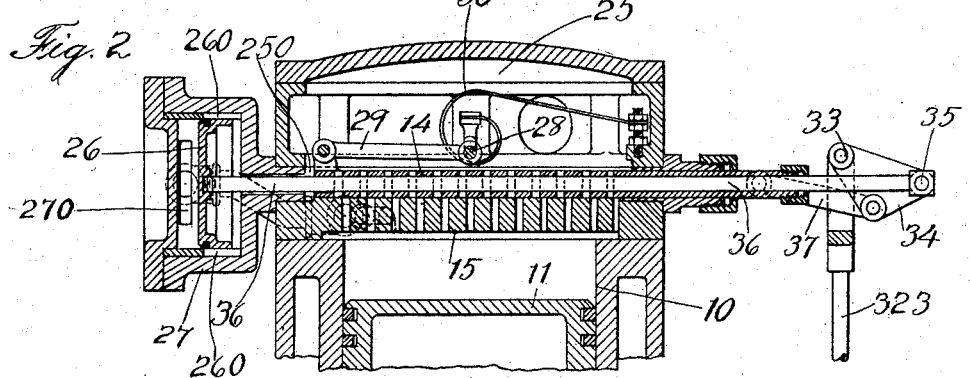
Figure 3:
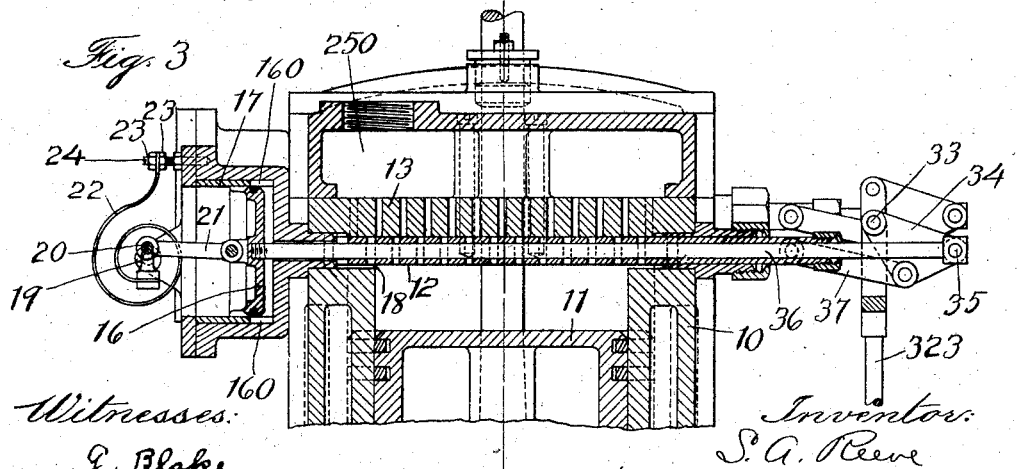

Of the accompanying drawings, Figure 1 represents a plan view showing the discharge-valve, the outer side of the admission-valve seat and the valve-connections of a compressor constructed according to my invention. Fig. 2 represents a vertical section taken through the discharge-valve. Fig. 3 represents a similar section through the admission-valve. Fig. 4 represents a cross section through both valves. Fig. 5 represents an elevation of the compressor showing the positive gear. Fig. 6 represents a top plan view thereof. Fig. 7 represents an end view of the toggle-link and spring gear applied to the admission-valve.

The same reference characters indicate the same parts in all the views.

In the drawings, 10 indicates the compressor cylinder of which I have shown one head equipped with admission and discharge valves.

11 is the piston.

12 is a slotted grid admission-valve working inside of the cylinder against a complementally-slotted seat 13 which occupies nearly one-half of the surface of the cylinder-head, and 14 is a similar grid discharge-valve working outside of the cylinder upon a grid seat 15 which occupies the other half of the cylinder head.

25 is the discharge-chamber located beyond the discharge-valve and connecting with the delivery-pipe. 250 is the admission-chamber antecedent to the admission-valve.

The admission-valve 12 is connected with a motor piston 16 operating in a short cylinder 17 whose outer end is open to the atmosphere and whose inner end connects by a duct 18 with the shallow clearance space formed at the end of the cylinder. This piston also acts as an auxiliary admission-valve, for at its inner limit of movement its ring uncovers the ends of slots 160 in the cylinder bushing, permitting access of atmospheric air to the interior of cylinder 10 by way of duct 18.

Journaled at the mouth of cylinder 17 is a rock-shaft 19 formed with a crank 20 of small throw, which is connected by a link 21 with piston 16, the two constituting a toggle. Rock-shaft 19 has attached to it one end of a strong spiral spring 22 whose other end is secured between two nuts 23 adjustable on a fixed threaded stud 24. This spring is neutral in tension at the intermediate position of crank 20 and valve 12, and the adjustable nuts 23 enable the neutral position to be shifted somewhat to one side or the other. When the movement of the valve and piston rotates crank 20 in either direction toward dead center, the spring is put in tension and as the crank approaches center the mechanical advantage of the spring increases until it becomes infinite at dead center. Hence the spring is always able to start the valve toward an opening or closing position when the valve is at either extreme of its movement.

For the control of discharge-valve 14 a mechanism is provided very similar to the one described for the admission-valve, except in regard to the direction in which the fluid pressures work and the location of the toggle-and-spring mechanism. The discharge-valve has a piston 26 connected with it and working in a short cylinder 27 to the outer end of which the clearance space of the main cylinder 10 is connected by a duct 270. The inner end connects with the discharge chamber 25 by a duct 250. Thus the pressure in the cylinder operates on the outer side of piston 26 while the pressure in the discharge-chamber 25 operates on the inner face of the piston. This piston also operates as an auxiliary discharge-valve at the inner end of its movement by uncovering the ends of slots 260. A small crank 28, link 29, and spring 30 with an adjustment for its fixed end, are provided for discharge-valve 14, similar to the corresponding mechanism of the admission-valve but located within the discharge-chamber 25.

In the operation of this mechanism, assuming that the valves are rigidly connected with their motor pistons and free to move under the influence of fluid, spring, and inertia forces, and assuming further that the neutral or no-tension condition of the springs 22 and 30 are attained when the valves are just on lap with the ports of their valve seats, or very slightly overlapped, the sequence of events is substantially as follows: For the admission-valve, when the compressor piston 11 is at the top of its stroke and the clearance air is under pressure, this pressure will have forced valve piston 16 outwardly and closed the admission-valve 12 well over the lap position, thereby swinging the small crank 20 toward its outer dead center and putting spring 22 under tension. As soon as the main piston 11 begins to move out on the admission stroke and re-expand the clearance air, the pressure of spring 22 acting at that moment with great mechanical advantage upon valve 12, starts the valve toward open position and the moment that a slight vacuum is created in the cylinder the atmospheric pressure on the outer face of piston 16 comes into play and aids the spring pressure in producing a quick and powerful opening of the valve. The small crank 20 swings past its intermediate position toward the inner dead center and if the momentum of the valve is considerable, the toggle formed by crank 20 and link 21 will nearly straighten and bring the valve quietly to rest without shock, at the same time storing up power in spring 22 ready for a closing movement when the main piston approaches the completion of its suction-stroke. As the main piston approaches its outer dead center, the admission-valve 12 is all ready to close and will have started on its return movement by virtue of the stored power of spring 22 acting at that moment with great mechanical advantage upon the toggle. As the main piston goes over dead center and starts on its compression stroke, if the admission-valve is not then already closed it will be very nearly on lap with the ports of its seat 13, and the tendency to increase of pressure within the cylinder 10 which occurs, will immediately complete the closing of the valve by the exertion of the compression pressure on the inner face of piston 16. The accumulating cylinder pressure completes a sharp movement of the valve to the closed extreme of its movement and toggle 20, 21 at its outer dead center brings the valve quietly to rest again without shock, in which position the valve tends to remain until the main piston starts again on its admission stroke and re-expands the clearance air, whereupon the foregoing cycle is repeated. Thus at high speeds, when the inertia forces are strong, they are turned to useful ends by storing pressure in the spring for a stronger and more rapid acceleration of the valve on its return movement at the very time when this return movement needs to be the most rapid. When the strokes of the compressor are least frequent and the inertia forces least powerful, the valve is started back less quickly, and it may have a smaller amplitude of movement. At all speeds the fluid pressures acting on piston 16 are the primary motive forces for propelling the valve, while the toggle-and-spring mechanism is a governing and power-storing agency which overcomes and utilizes the inertia forces in a most effective manner.

For the discharge-valve, the action which takes place is quite similar to the case of the admission-valve, but the fluid forces in this case are the pressure of the discharge-pipe on the one hand, and the varying pressure within the main cylinder on the other hand. When the admission-valve opens at the beginning of the suction stroke, the discharge-valve 14 is closed by the heavy discharge pressure acting on the inner face of piston 26, and it remains closed until the working piston has passed its outer dead center and returned on the compression stroke to a point where the accumulating compression pressure within the cylinder acting on the outer face of piston 26, substantially counterbalances the discharge pressure, and leaves the spring 30 ree to return the discharge-valve toward an open position. Any preponderance of cylinder pressure over discharge pressure naturally accelerates this movement, and the combined fluid motive pressure and inertia tend to throw the discharge-valve to the full-open extreme of its movement. That extreme will ordinarily be reached some time before the main piston reaches dead center on the compressing stroke, and spring 30 will have started the discharge-valve on its closing stroke by the time dead center is reached. The moment any preponderance of discharge pressure over cylinder pressure exists, the closing movement of the valve is augmented by pressure on the inner face of piston 26, and valve 14 is thrown to the closed extreme of its movement.

In the case of both the admission and discharge valves, the closing movement of the valve of course takes place at a time when fluid pressures on opposite sides of the valve are most nearly balanced and friction of the valve is at a minimum. At this time, fluid pressures on the valve are least active, but they and the pressure of the springs are most potent to move the valve, owing to the reduced friction.

Thus far the valves have been described as operated wholly by fluid pressure, inertia, and spring forces. These forces and the described mechanism for applying them may be modified by, and combined with, a positive motion, as shown in the drawings. Therein, 31 is a reciprocating rod receiving motion from a suitable source such as an eccentric 32 (Fig. 5) on the crank-shaft of the compressor, by way of an eccentric rod 320 and link 321, and transmitting it by way of rock-lever 322, rods 323 and pins 33 to triangular levers 34, each of which is fulcrumed at 35 on the extremity of a rod 36 which traverses one of the compressor valves and connects with its controlling piston 16 or 26. I have shown the positive motion applied to both valves. The triangular lever 34 connects by a link 37 with the compressor valve 12 or 14 and thus the valve receives motion from a moving part whose motion is at right-angles to the path of the valve. The object of this is that both the automatic and the positive movements of the valve may take place without either movement interfering with the other, but that the positive gear shall control the valve under certain conditions.

Taking the case of the admission-valve 12, and assuming that the valve and its rod 36 are independently movable in a parallel direction, the effect of the combined positive and pressure-controlled valve mechanism is as follows. The eccentric 32 of the positive mechanism is preferably set so as to open the admission valve at the latest point in the suction stroke of the working piston at which the conditions of compressor operation will call for an opening. This opening is affected by a movement of rod 323 which bends the toggle formed by lever 34 and link 37, and draws valve 12 to the right, as seen in Fig. 3, on the fulcrum 35. The pressure-controlled piston 16, however, comes into action to secure an earlier opening of the valve when the pressure conditions require it. The valve should open when the clearance air has expanded down to atmospheric pressure in the early part of the suction stroke. Any expansion of the clearance air below atmosphere will cause a preponderance of atmospheric pressure on piston 16 acting to the right in Fig. 3, and this will start the valve 12 open (toggle 34, 37 being then straight) before the eccentric has reached its valve-opening position. Thereafter the eccentric moves the valve to full-open position and positively closes the valve at the end of the suction stroke, while piston 16 is still at or near its innermost position. During the compression stroke, piston 16 is forced outwardly by fluid pressure to its outer position, such travel being permitted by the bending of toggle 34, 37, and by a lateral movement in the direction of the compressor cylinder, of which valve-rod 323 is capable.

For the purpose of putting the positive gear out of action when desired, and subjecting the valve simply to the automatic control first described, I have shown a hand-lever 400 and connections for moving the rod 31 to the center of motion of link 321.

The action of the positive gear for discharge-valve 14 is similar to that of the admission-valve. The eccentric for the discharge-valve is set to secure the latest opening desired, and any earlier opening required by pressure conditions is effected by the cylinder pressure forcing piston 26 to the right when the toggle 34, 37 of the discharge-valve positive gear is straightened, the positive gear then acting to fully open the valve, and acting to close it at the proper time.

For the purpose of classifying and clearly presenting my invention I have described and claimed it as an improvement in valve-mechanisms for elastic-fluid compressors, that being the most important application now known to me, but it will be understood that other uses are contemplated and may be effected without departure from the underlying principles set forth, as for instance to gas-engines which usually are both compressor and motor, to steam motors etc.; and that the valve-mechanism here shown, instead of being a primary instrumentality for the direct control of entrance and exit to the main engine cylinder, may be one of a series of instrumentalities for effecting the same or similar objects.

I do not here claim broadly a toggle-and-spring mechanism for fluid valves, irrespective of the character of the valve parts with which it is combined, the same being claimed by me in a prior application, Serial No. 75,819, nor do I consider myself the first inventor of a grid discharge-valve operated by a piston device subject differentially to the cylinder and discharge pressures.

I claim:—

1. A valve mechanism comprising a pressure-balanced valve, a motor piston therefor subject to the counter internal and external pressures, and means for yieldingly centralizing the valve.

2. A valve mechanism comprising a fluid-pressure chamber, a valve controlling communication between the interior and exterior of the chamber, a motor device for actuating said valve, subject in opposite directions to the internal and external fluid pressures, spring mechanism for yieldingly centralizing said valve, and means for increasing the mechanical advantage of the spring mechanism upon the valve at the extremes of movement of the valve.

3. In a valve mechanism, the combination with a fluid-pressure cylinder and piston, of a pressure-balanced valve controlling communication with the interior of the cylinder, means for storing the force caused by movements of the valve, and a fluid-pressure valve motor controlled by variations in the pressure within the cylinder.

4. A valve mechanism comprising a cylinder, a valve of the grid type controlling communication with the interior of the compressor cylinder, means for opening and closing said valve by differences in the fluid pressures internal and external to said cylinder, and means for yieldingly centralizing said valve by mechanical pressure.

5. A valve mechanism comprising a fluid-pressure chamber, a valve of the grid type, a valve-operating piston receiving on opposite sides of the pressures internal and external to the chamber, a toggle mechanism for arresting the valve in full-open and full-closed positions, and a spring device associated with said toggle mechanism, for yieldingly maintaining the latter and the valve in an intermediate position, and acting with increased mechanical advantage on the valve in the extreme positions of the latter.

6. In a valve mechanism, the combination with a cylinder and piston, of a grid-valve seat formed on the inner side of the wall of the clearance space, a grid admission valve coöperating with said seat, and a motor piston attached to said valve and subject on one side to the pressure of said clearance space, acting in a direction to close the valve, and subject on the opposite side to the admission pressure, acting in a direction to open the valve.

7. In a fluid pump, the combination with the cylinder and piston, of a valve controlling communication with said cylinder, a positive valve-operating mechanism timed to open the valve at the latest point desired, and a fluid-actuated mechanism subject to the pressure within the cylinder, for opening said valve at an earlier point.

8. In a fluid pump, the combination with the cylinder and piston, of a valve-operating mechanism including a toggle having one of its two links connected with the valve, and a piston connected with the other link and subject on opposite sides to the pressures internal and external to the cylinder.

9. In combination, a cylinder and its piston, a reciprocating valve, a valve-operating toggle, a valve rod timed with the piston and having a movement across the line of the straightened toggle, and a member actuated differentially by the pressures internal and external to the cylinder, connected with one end of the toggle and having a motion longitudinal of the line of the straightened toggle.

10. In a valve-mechanism for cylinders, the combination of a valve-structure including a valve balanced against the motive pressure of the fluid which it controls and a piston attached thereto and subject to said pressure, and means for yieldingly arresting the motion of the two by an elastic resistance having an adverse mechanical advantage which increases with the departure of the valve-structure from a medial position.

In testimony whereof I have hereunto set my hand in the presence of two subscribing witnesses, the first day of August 1906.

SIDNEY A. REEVE.

Witnesses:
   A. D. HARRISON,
   E. BATCHELDER.